US006978284B2

(12) United States Patent
McBrearty et al.

(10) Patent No.: US 6,978,284 B2
(45) Date of Patent: Dec. 20, 2005

(54) SYSTEM AND METHOD FOR DESIGNATING AND DELETING EXPIRED FILES

(75) Inventors: Gerald Francis McBrearty, Austin, TX (US); Johnny Meng-Han Shieh, Austin, TX (US); Vi Trieu Tran, Austin, TX (US); Michael W. Wortman, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 10/104,718

(22) Filed: Mar. 21, 2002

(65) Prior Publication Data

US 2003/0182332 A1 Sep. 25, 2003

(51) Int. Cl.[7] .............................................. G06F 17/30
(52) U.S. Cl. ..................................... 707/206; 707/200
(58) Field of Search ........................... 713/300; 714/4; 386/46; 717/171; 711/162; 700/121; 707/204

(56) References Cited

U.S. PATENT DOCUMENTS

| | | | |
|---|---|---|---|
| 6,185,474 B1 * | 2/2001 | Nakamura et al. ........... 700/121 |
| 6,301,670 B1 * | 10/2001 | Motoyama et al. ........... 713/300 |
| 6,304,948 B1 * | 10/2001 | Motoyama et al. ........... 711/162 |
| 6,314,565 B1 * | 11/2001 | Kenner et al. ............... 717/171 |
| 6,577,806 B1 * | 6/2003 | Hirota .......................... 386/46 |
| 6,687,846 B1 * | 2/2004 | Adrangi et al. ................. 714/4 |

* cited by examiner

Primary Examiner—Jean M. Corrielus
(74) Attorney, Agent, or Firm—Van Leeuwen & Van Leeuwen; Joseph T. Van Leeuwen; Marilyn S. Dawkins (57) ABSTRACT

A system and method for designating and deleting expired files includes a means for storing expiration dates along with file identification data maintained by the file system. An earliest expiration date is stored in data maintained by the file system pertaining to each directory. In this manner, a check of the directory data indicates whether one or more expired files exist in the directory. The system date is compared to the earliest expiration date for a directory, for example when a "list contents of directory" command is received. If the earliest expiration date is earlier than the system date then a comparison is made with the files in the directory and individual files with expiration dates earlier than the current date are deleted. The earliest expiration date is then update to the correspond to the next earliest expiration date falling after the current date.

20 Claims, 6 Drawing Sheets

Figure 1

| Directory Entry Items 200 | | | |
|---|---|---|---|
| 210 Parent Directory | 220 Current Entry Name | 230 Creation Date | 240 Expiration Date |
| HTTPServer | pub | 02/04/1997 | 02/05/2001 |
| pub | Index.html | 03/17/1997 | NULL |
| pub | Products.html | 06/20/1997 | NULL |
| pub | Service.html | 02/04/1997 | NULL |
| pub | special_offer.html | 03/17/1997 | 07/03/2001 |
| pub | next_months_plans.html | 06/20/1997 | 02/05/2001 |

SYSTEM AND METHOD FOR DESIGNATING AND DELETING EXPIRED FILES

BACKGROUND OF THE INVENTION

1. Technical Field

The present invention relates in general to a system and method for designating and deleting expired files. More particularly, the present invention relates to a system and method for identifying expired files during a list file operation and deleting identified files accordingly.

2. Description of the Related Art

A common system management challenge is reducing the number of old, unused files that are maintained by the file system. As old, unused files accumulate on the file system the system administrator often attempts to remember to erase the files when they are no longer needed. Many files are time sensitive in nature.

For example, documents on a stock analysis web site may include articles regarding stocks that are currently being recommended as stocks to "buy" or "sell." Because of the nature of the stock market and stock recommendations, the stock recommendations provided today are of little or no value months or years from the recommendation date. Other documents, such as those pertaining to special promotions or offers with limited time availability, are also time sensitive and should be purged periodically from the system.

Currently, system administrators may remind themselves using electronic or paper notes to delete certain files when the usefulness of such files has expired. System administrators may also make calendar entries in an electronic or paper calendar prompting the administrator to delete certain files at a future data. A challenge with these methods is that the system administrator's notes are not maintained with the files that will be deleted. If the system administrator's notes are lost, it will be difficult to remember what files need to be deleted at a given date.

An additional challenge is presented when a system is used by multiple users. The users that create files may not inform the system administrator of the time sensitive nature of certain files. In addition, some users may not inform the system administrator that certain files should be deleted. In these systems, each of the users needs to set reminders regarding expired files or inform the system administrator that certain files should be deleted at some point in the future. These methods lead to inefficiencies for the users and system administrator. Moreover, with multiple users it is more likely that the users or system administrator will forget to delete the files once the expiration date has passed.

Another challenge with the current state of the art is that system administrators delete files manually when reminded by their calendar or notes. For example, if a directory of stock recommendations should be deleted in six months, the system administrator sets a reminder for themselves (i.e., in a calendar or note) and, when six months have elapsed, manually deletes the directory containing the stock recommendations. These manual activities are inefficient uses of the system administrators' time. Busy system administrators may in fact forgo cleaning up expired files because of the time needed to perform such activities.

What is needed, therefore, is a system and method in which the file expiration data is designated and maintained along with system data used to manage the file. In addition, what is needed is a way to delete the file once the file's expiration data has passed. Moreover, what is needed is a way to delete such expired files by using minimal system resources.

SUMMARY

It has been discovered that the aforementioned challenges are overcome by including expiration date information along with system information that is maintained for each file by the file system. In a UNIX type operating system, such as the IBM AIX™ operating system, file system information is stored in inodes and extended attributes.

When a file is first created the expiration date corresponding to the file is initialized. For example, the system administrator may assign a default expiration date for each file as NULL signifying that the file has no expiration date. The system administrator could also assign a default expiration date for each file so that the file's expiration date is a certain period (i.e., one year) after the creation date. The assignment of default expiration dates may vary depending upon the type of system being administered and the type of data commonly stored on the system.

Notwithstanding any default expiration date, users and the system administrator can set an expiration date on one or more files. For example, a system may be configured so that there are no default expiration dates (e.g., expiration date=NULL). However two files are created that pertain to a certain promotion that expires in two months. Expiration dates for these files can be set to a future date (i.e., one month after the promotion ends).

Expiration date information is stored along with system managed file data, such as the file name, creation date, size, and other data pertaining to the file. The earliest expiration date in a given subdirectory can be stored in the system managed file data that corresponds with the directory. In this manner, a quick review of the directory will indicate whether there are files in the directory with expiration dates. If there are files within the directory with expiration dates, the expiration date stored in the directory entry will also indicate whether at least one of such files needs to be deleted (i.e., the earliest expiration date is earlier than the current date).

In one embodiment, a deletion method is invoked in conjunction with one or more system commands that list the contents of a directory (e.g., "ls" in a UNIX environment, "dir" in a PC-DOS environment, etc.). When a command is invoked to list the contents of a directory, a check is made as to whether any files within the directory have expired (i.e., the earliest expiration date maintained in the directory entry is earlier than the current date). This is done so that if there are no files that need deletion, the entire inode or metadata table will not need to be examined as part of a date comparison. If this is the case, the contents of the directory are analyzed for each file that has expired (i.e., each file with an expiration date earlier than the current date) and all such files are deleted. After the files are deleted, the remaining files are displayed to the user in response to the user's list directory contents command. But as part of this action, the contents of the inode or metadata is examined to find the next, nearest date that will require file deletion. This value is stored within the inode table for the next table examination and comparison. In this manner, expired files are purged from the system in a passive manner without using background processes that use additional system resources.

In another embodiment, a process waits for a particular day and time to wakeup and check the system for expired files. The deletion method is used in conjunction with a command used to list directory contents (as described above), however in this embodiment directory contents for each directory in the computer system are listed and, hence, all expired files are purged without relying on the user to visit a particular directory. In a UNIX environment, the command "find . -type d -print" would visit each directory and cause all expired files to be purged without displaying the contents of the remaining files. In this manner, a process could be scheduled to wakeup every Sunday morning at 1:00 AM to perform the "find" command and purge the system of all expired files.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
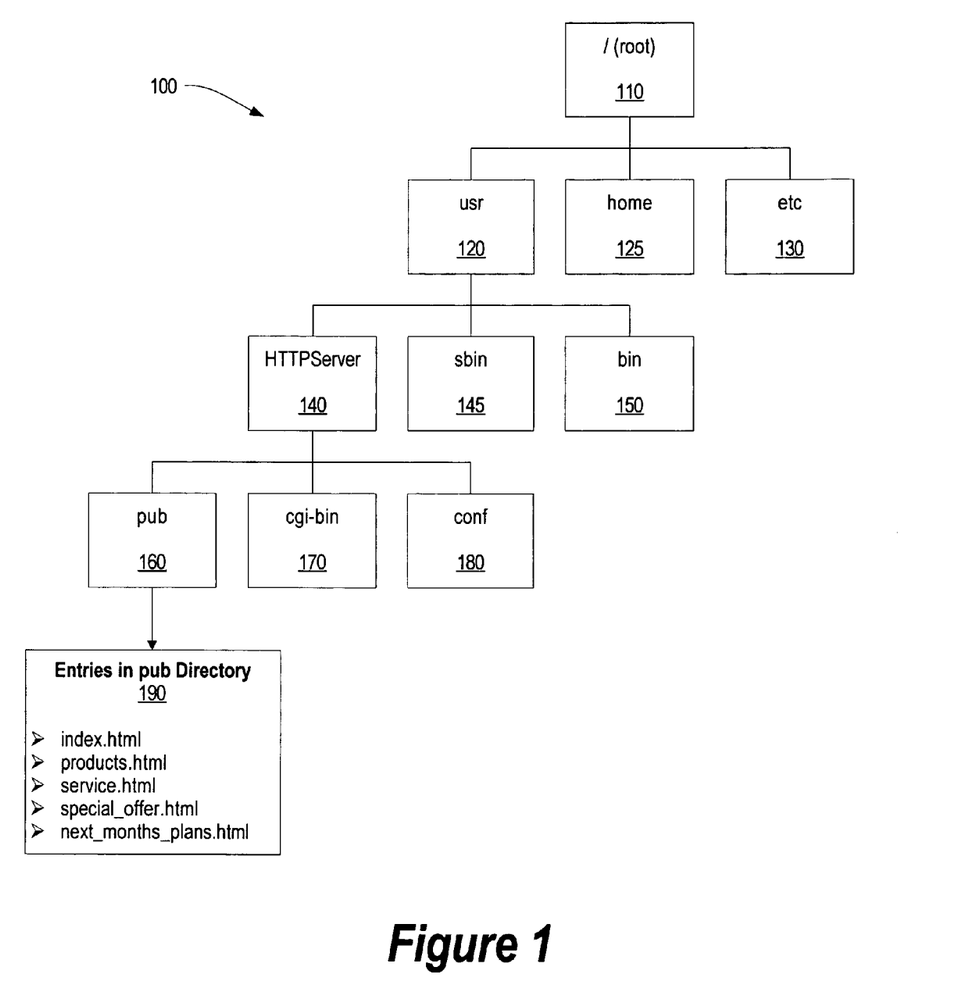
FIG. 1 is an example of a directory tree wherein one of the directory nodes includes files with expiration dates.

FIG. 1 is an example of a directory tree wherein one of the directory nodes includes files with expiration dates. Directory tree 100 includes root (/) directory 110. Root directory 110 is shown with three directories: usr directory 120, home directory 125, and etc directory 130. These directories are used to help organize information so that the information is easier to manage and retrieve. usr directory 120 is also shown with three subdirectories: HTTPServer directory 140, sbin directory 145, and bin directory 150. As the name implies, HTTPServer directory 140 may be used to store information used by an HTTP Server to provide documents to users over the Internet. HTTPServer directory 140 also includes three directories: pub directory 160, cgi-bin directory 170, and conf directory 180. As the name implies, pub directory 160 may be used to store publications that are provided to Internet users that use the HTTP server. pub directory contents 190 are shown to include five files: index.html, products.html, service.html, special_offer.html, and next_months_plans.html. As the names imply, special_offer.html and next_months_plans.html include time sensitive information that is not useful or valid after a certain point in time. For example, the special offer information is of little value after the special offer period expires. For these reasons, expiration dates are applied to these files as is shown in more detail in FIG. 2.

Figure 2:
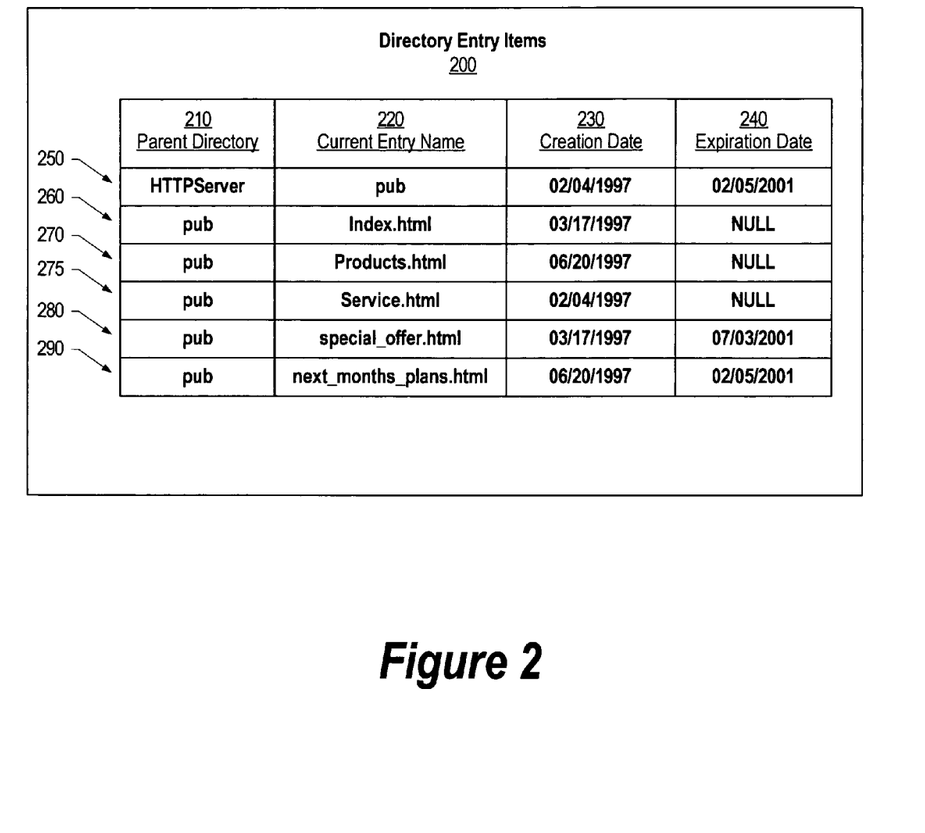
FIG. 2 shows directory data pertaining to a directory that includes files with expiration dates.

FIG. 2 shows directory data pertaining to a directory that includes files with expiration dates. Directory data 200 is in a table format that is efficiently processed by the file system. Each directory entry includes a number of fields. These fields include parent directory field 210, current name field 220, creation date field 230, and expiration date field 240, along with other information pertaining to the directory entry.

Parent directory field 210 includes the name of the parent directory for the directory item. In the example shown, the pub directory's parent directory is HTTPServer while all the files within the pub directory have a parent directory of pub (see FIG. 1 for directory names used in this example).

Current name field 220 includes the name of the directory item, so pub is the name of the first entry shown (the name of the directory). The other directory entries have current name's corresponding to the name of the individual files (see FIG. 1 for another view of the names of files within the pub directory).

Creation date field 230 includes the date the particular directory entry was created. For example, the pub directory was created on Feb. 4, 1997 and files within the pub directory were created between Mar. 17, 1997 and Jan. 4, 2001.

Expiration date field 240 includes the date the particular entry expires, or, in the case of an entry pertaining to a directory the date the earliest file within the directory expires. If a file does not have an expiration date, the expiration date is set to NULL (no value). In the case of a directory entry, the expiration date is set to NULL if no files within the directory have an expiration date.

In the example shown, entry 250 includes data pertaining to the pub directory. The parent directory for entry 250 is HTTPServer and the name of entry 250 is pub. The directory was created on Feb. 4, 1997 as shown by its creation date. Finally, the earliest expiration date for any file within the pub directory is Feb. 5, 2001. An examination of the files within the pub directory would reveal which file has such an expiration date.

The next three entries (entry 260 corresponding to index.html, entry 270 corresponding to products.html, and entry 275 corresponding to service.html) have no expiration date associated with them, as evidenced by the NULL value in each entry's expiration date field.

The final two entries (entry 280 corresponding to special_offer.html and entry 290 corresponding to next_months_plans.html) each have an expiration date. Entry 280 has an expiration date of Jul. 3, 2001, while entry 290 has an expiration date of Feb. 5, 2001. The earliest of these expiration dates is Feb. 5, 2001 which corresponds to the earliest expiration date included in directory entry 250. If a list directory contents command was performed on this directory prior to Feb. 5, 2001 the earliest expiration date in entry 250 would be used to determine that no files in the directory have expired and, therefore, no files would be deleted. If the list directory contents command was performed after Feb. 5, 2001, each of the entries would be analyzed to determine if it should be deleted. Files with no expiration date (i.e., entries 260, 270, and 275) would not be deleted. Files with an expiration date would have their expiration date compared with the current date to determine whether they should be deleted. For example, if the list directory command was invoked on Mar. 1, 2001 then only entry 290 would be deleted. However, if the list directory command was invoked on Aug. 1, 2001 then both entries 280 and 290 would be deleted.

Figure 3:
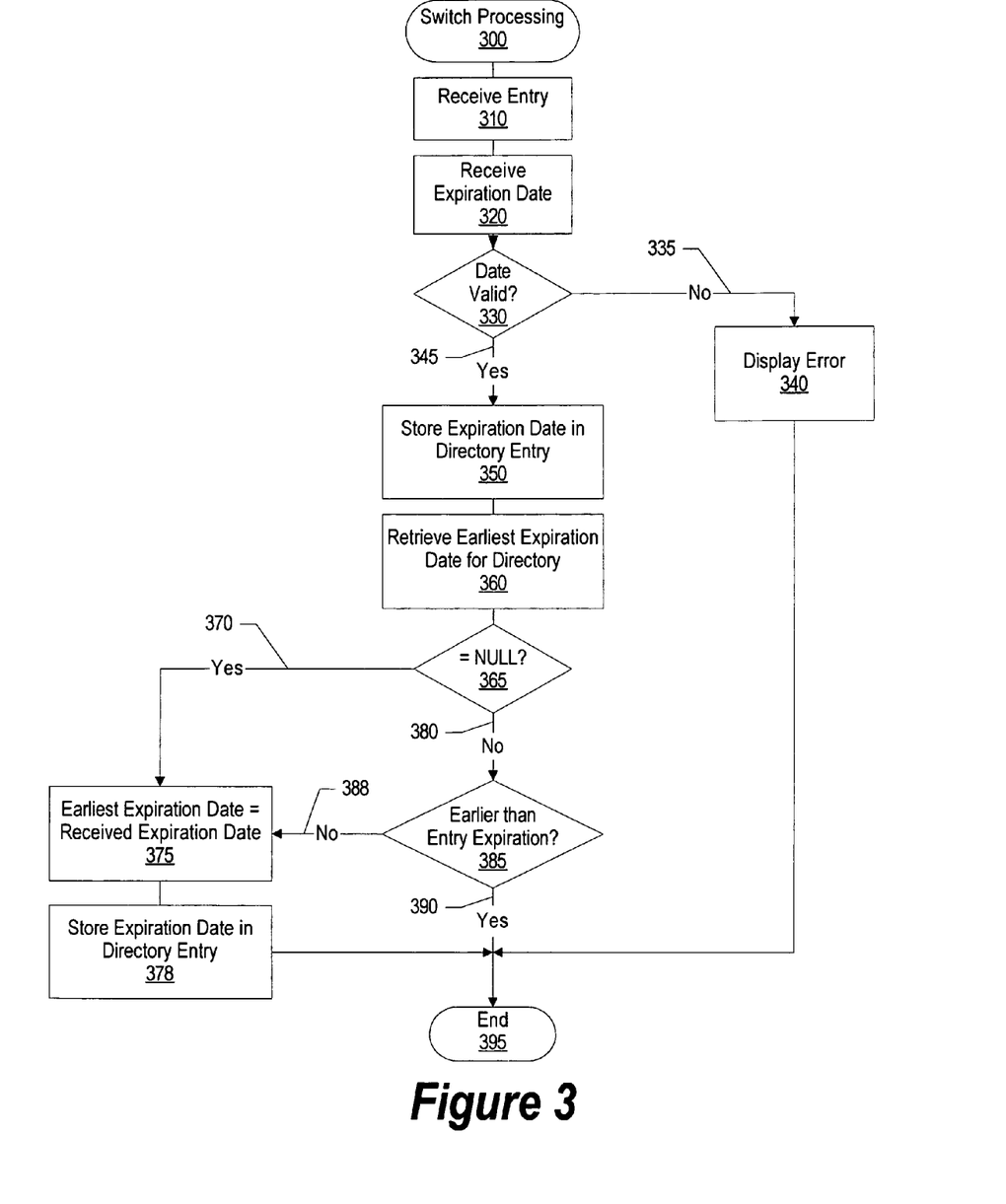
FIG. 3 is a flowchart showing the process of setting expiration dates for files.

FIG. 3 is a flowchart showing the process of setting expiration dates for files. Processing commences at 300 whereupon an entry identifier is received (step 310). An expiration date is also received (step 320) that corresponds to the entry identifier.

A determination is made as to whether the received expiration date is a valid date (decision 330). If the received expiration date is not a valid date, decision 330 branches to "no" branch 335 whereupon an error message is displayed to the user (step 340) and processing ends at 395.

On the other hand, if the received expiration date is a valid date, decision 330 branches to "yes" branch 345 whereupon the expiration date is stored in the directory entry corresponding to the received entry identifier (step 350, see FIG. 2 for an example of expiration dates stored in directory entries). The earliest expiration date that corresponds to the directory is retrieved (step 360, see entry 250 in FIG. 2 for an example entry).

A determination is made as to whether the earliest date is currently NULL, i.e., this is the first entry within the directory to have an expiration date (decision 365). If the earliest expiration date corresponding to the directory is NULL, decision 365 branches to "yes" branch 370 whereupon the earliest expiration date for the directory is set to the received expiration date (step 375). The new earliest expiration date is then stored in the directory entry corresponding to the directory (step 378). On the other hand, if the earliest expiration date is not NULL, decision 365 branches to "no" branch 380 whereupon another determination is made as to whether the earliest expiration date is earlier than the received expiration date (decision 385). If the earliest expiration date is not earlier than the received expiration date, decision 385 branches to "no" branch 388 whereupon the earliest expiration date for the directory is set to the received expiration date (step 375). On the other hand, if the earliest expiration date for the directory is earlier than the received expiration date then decision 385 branches to "yes" branch 390 and the earliest expiration date is not changed. Processing subsequently ends at 395.

Figure 4:
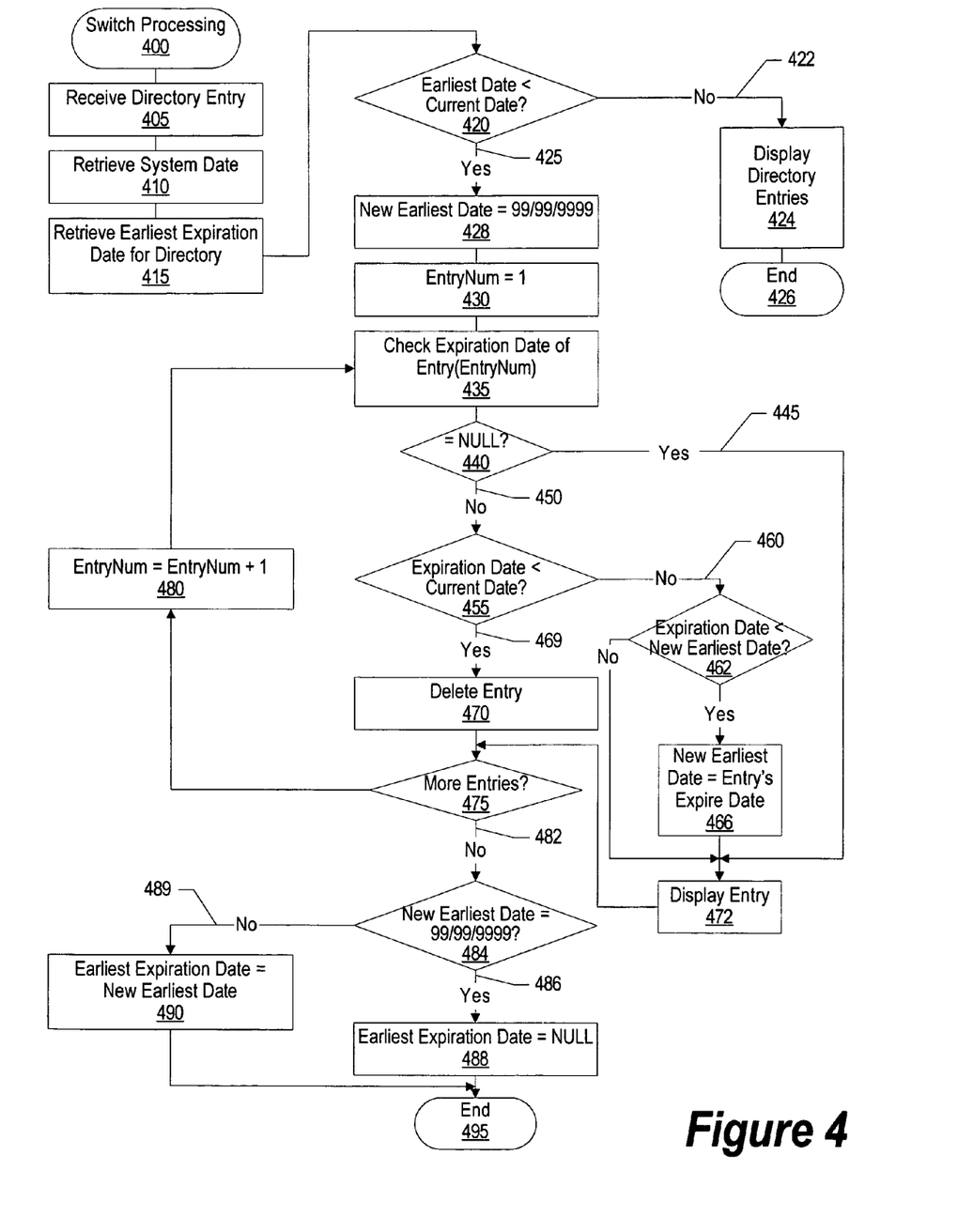
FIG. 4 is a flowchart showing the process of deleting expired files during a list directory contents command.

FIG. 4 is a flowchart showing the process of deleting expired files during a list directory contents command. Processing commences at 400 whereupon a directory entry is received corresponding to the list directory contents command (step 405). The system date is retrieved from the computer system (step 410). The earliest expired file date is retrieved from the directory entry (step 415, see entry 250 in FIG. 2 for an example of a directory entry).

A determination is made as to whether the earliest expired file date retrieved for the directory is earlier than the current date (decision 420). If the earliest expired file date is not earlier than the current date, no files are expired within the directory so no deletions need to take place. In this case, decision 420 branches to "no" branch 422 whereupon the contents of the directory are displayed (step 424) and processing ends at 426.

On the other hand, if the earliest expired file date is earlier than the current date, decision 420 branches to "yes" branch 425 whereupon a NewEarliestDate is initialized to a high value (i.e., 99/99/9999) (step 428) and a counter EntryNum is initialized to 1. The expiration date of the first entry (i.e., EntryNum=1) is analyzed (step 435).

A determination is made as to whether the entry's expiration date is NULL (decision 440). If the entry's expiration date is NULL, decision 440 branches to "yes" branch 445 whereupon the entry is displayed (step 472) and the entry is not deleted.

On the other hand, if the entry's expiration date is not NULL, decision 440 branches to "no" branch 450 whereupon a determination is made as to whether the entry's expiration date is earlier than the current date (decision 455).

If the entry's expiration date is not earlier than the current expiration date, decision 455 branches to "no" branch 460 whereupon a determination is made (decision 462) as to whether the entry's expiration date is earlier than the current NewEarliestDate value that is used to store the new earliest expiration date corresponding to the directory. If the entry's expiration date is earlier than the NewEarliestDate then decision 462 branches to "yes" branch 464 whereupon the NewEarliestDate value is set to the entry's expiration date. On the other hand, if the entry's expiration date is not earlier than the NewEarliestDate then decision 462 branches to "no" branch 468 leaving the NewEarliestDate value unchanged. The entry is then displayed (step 472) and the entry is not deleted.

On the other hand, if the entry's expiration date is earlier than the current date, decision 455 branches to "yes" branch 469 whereupon the entry is deleted (step 470).

A determination is made as to whether there are more entries in the directory to process (decision 475). If there are more entries to process, decision 475 branches to "yes" branch 478 whereupon the entry number (EntryNum) is incremented (step 480) and processing loop back to process the next entry. This looping continues until there are no more entries to process, at which time decision 475 branches to "no" branch 482 whereupon a determination is made (decision 484) as to whether there are still files in the directory with an expiration date (i.e., is the NewEarliestDate value unchanged?). If the NewEarliestDate value was not changed, decision 484 branches to "yes" branch 486 whereupon the new earliest expiration date (NewEarliestDate) for the directory is set to NULL. On the other hand, if the NewEarliestDate value has changed (indicating that at least one file in the directory has an expiration date), decision 484 branches to "no" branch 489 leaving the value unchanged. The value in the earliest expiration date for the directory (NewEarliestDate) is now either the date of the earliest expiration date corresponding to a file in the directory or is NULL indicating that no file in the directory has an expiration date. The earliest expiration date for the directory is now set to the new earliest date (NewEarliestDate) value (step 490) and processing ends at 495.

Figure 5:
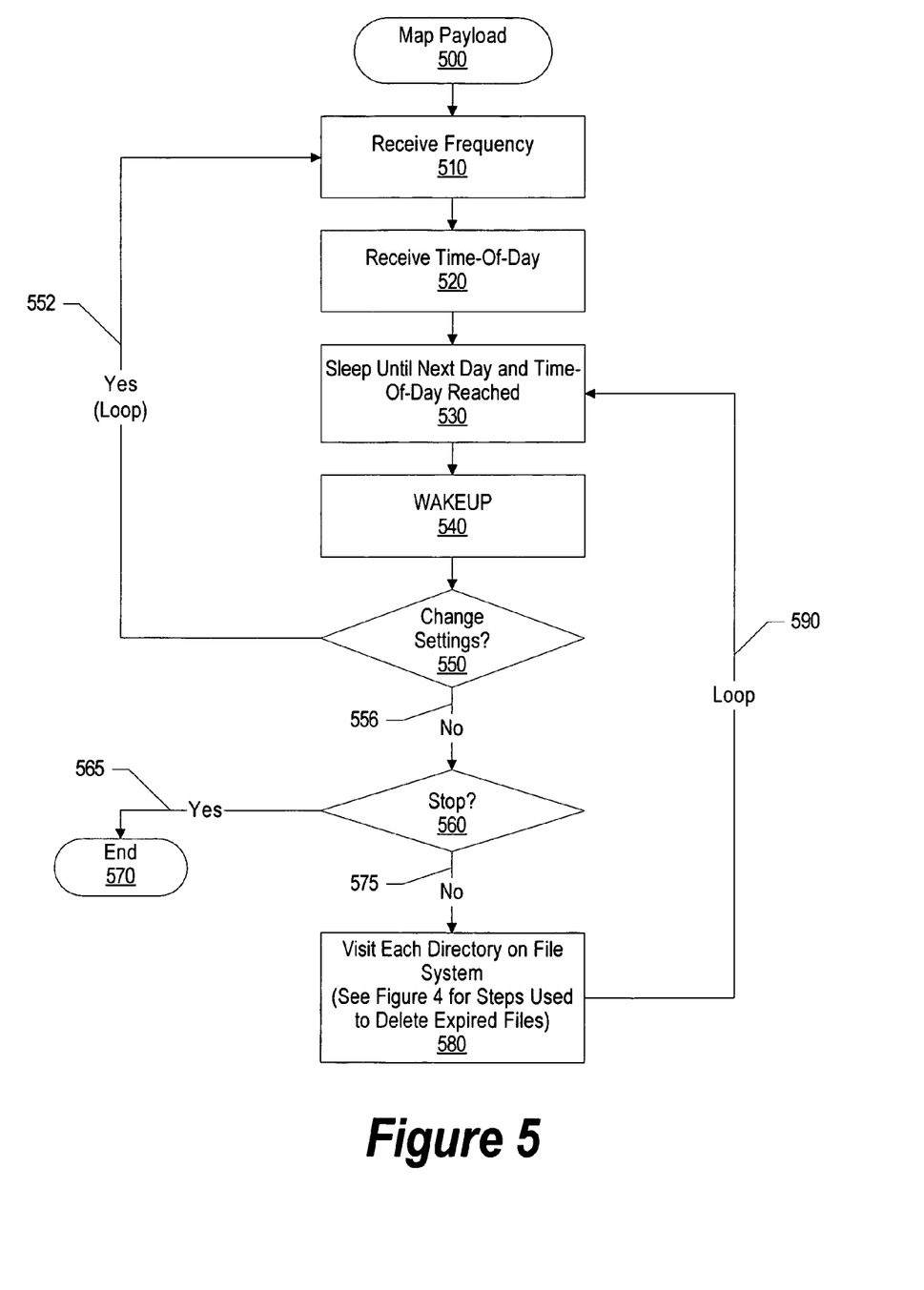
FIG. 5 is a flowchart showing the process of periodically purging expired files using a background process.

FIG. 5 is a flowchart showing the process of periodically purging expired files using a background process. Processing commences at 500 whereupon a frequency is received (step 510). For example, the user may request that the process be performed daily, weekly, monthly, etc. A time of day is also received (step 520). For example, the user may select a time such as 1:00 AM for the process to run. The process then sleeps in the background until the day and time of day specified by the user is reached or the process is interrupted by the user (step 530).

When either the day and time of day occurs or the process is interrupted by the user, the process wakes up (step 540). A determination is made as to whether the user is requesting to change the background process settings (decision 550). If the user is requesting to change the background process settings, decision 550 branches to "yes" branch 552 which loops back to receive user settings from the user (steps 510 and 520, described above).

On the other hand, if the user is not requesting a change to background process settings, decision 550 branches to "no" branch 556 whereupon a determination is made as to whether the user or other process is requesting that the background process terminate (decision 560). If the user or other process is requesting that the background process terminate, decision 560 branches to "yes" branch 565 and background processing ends at 570.

On the other hand, if a request has not been received to terminate the background process, decision 560 branches to "no" branch 575 whereupon each directory on the file system is visited (step 580) using a process as described in FIG. 4. As previously discussed in FIG. 4, the process discussed in FIG. 4 will delete expired files and update the earliest expiration date information maintained at the directory level. In a UNIX environment, each directory can be visited using a command such as "find . -type d -print" which will visit the directories without displaying the directory entries. Processing loops back (loop 590) to sleep until the next interrupt is received.

Figure 6:
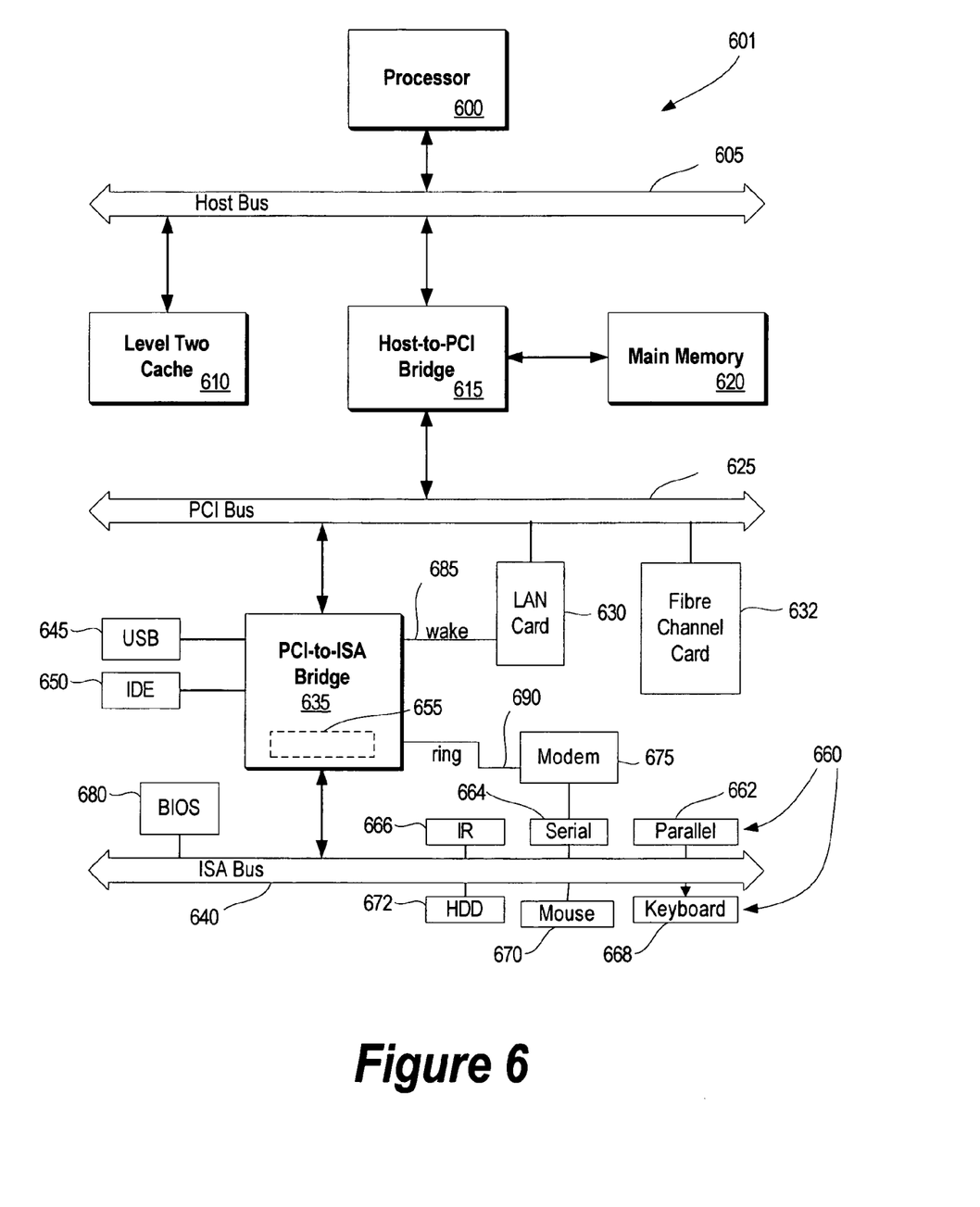
FIG. 6 is a block diagram of an information handling system capable of implementing the present invention.

FIG. 6 illustrates information handling system 601 which is a simplified example of a computer system capable of performing the computing operations described herein. Computer system 601 includes processor 600 which is coupled to host bus 605. A level two (L2) cache memory 610 is also coupled to the host bus 605. Host-to-PCI bridge 615 is coupled to main memory 620, includes cache memory and main memory control functions, and provides bus control to handle transfers among PCI bus 625, processor 600, L2 cache 610, main memory 620, and host bus 605. PCI bus 625 provides an interface for a variety of devices including, for example, LAN card 630. PCI-to-ISA bridge 635 provides bus control to handle transfers between PCI bus 625 and ISA bus 640, universal serial bus (USB) functionality 645, IDE device functionality 650, power management functionality 655, and can include other functional elements not shown, such as a real-time clock (RTC), DMA control, interrupt support, and system management bus support. Peripheral devices and input/output (I/O) devices can be attached to various interfaces 660 (e.g., parallel interface 662, serial interface 664, infrared (IR) interface 666, keyboard interface 668, mouse interface 670, and fixed disk (HDD) 672) coupled to ISA bus 640. Alternatively, many I/O devices can be accommodated by a super I/O controller (not shown) attached to ISA bus 640.

BIOS 680 is coupled to ISA bus 640, and incorporates the necessary processor executable code for a variety of low-level system functions and system boot functions. BIOS 680 can be stored in any computer readable medium, including magnetic storage media, optical storage media, flash memory, random access memory, read only memory, and communications media conveying signals encoding the instructions (e.g., signals from a network). In order to attach computer system 601 to another computer system to copy files over a network, LAN card 630 is coupled to PCI bus 825 and to PCI-to-ISA bridge 635. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the invention described herein, this computer system is simply one example of a computer system. Those skilled in the art will appreciate that many other computer system designs are capable of performing the invention described herein.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for managing files on a computer system, said method comprising:
   receiving a file expiration date that corresponds to a file stored in a directory;
   storing the file expiration date in a first data area managed by a file system, wherein the first data area includes a file identifier corresponding to the file;
   determining an earliest expiration date from one or more file expiration dates, wherein each of the file expiration dates correspond to a different file stored in the directory; and
   saving the earliest expiration date in a second data area managed by the file system, wherein the second data area includes a directory identifier corresponding to the directory.

2. The method as described in claim 1 further comprising:
   receiving a request, wherein the request includes the directory identifier;
   retrieving a current date from a computer system and the earliest expiration date from the second data area;
   comparing the earliest expiration date to the current date; and
   deleting one or more files from the directory in response to the earliest expiration date being earlier than the current date.

3. The method as described in claim 2 further comprising:
   determining a next earliest expiration date from one or more remaining file expiration dates, wherein the remaining file expiration dates correspond the files remaining in the directory following the deleting; and
   saving the next earliest expiration date in the second data area.

4. The method as described in claim 2 further comprising:
   comparing one or more file expiration dates corresponding to one or more files stored in the directory to the current date; and
   deleting at least one of the files in response to the file expiration date being earlier than the current date.

5. The method as described in claim 2 further comprising:
   displaying one or more files from the directory in response to the earliest expiration date not being earlier than the current date.

6. The method as described in claim 1 further comprising:
   identifying a plurality of directories, each of the directories including an earliest expiration date;
   comparing each of the earliest expiration dates to a current date; and deleting one or more files from one or more of the directories in response to the earliest expiration date for the respective directory being earlier than the current date.

7. The method as described in claim 1 wherein the first and second data areas are each part of an inode area managed by a UNIX operating system.

8. An information handling system comprising:
one or more processors;
a memory accessible by the processors;
a nonvolatile storage device managed by a file system, the nonvolatile storage device including one or more directories that include one or more files;
an file management tool for managing files on the nonvolatile storage device, the file management tool including:
means for receiving a file expiration date that corresponds to a file stored in a directory;
means for storing the file expiration date in a first data area managed by a file system, wherein the first data area includes a file identifier corresponding to the file;
means for determining an earliest expiration date from one or more file expiration dates, wherein each of the file expiration dates correspond to a different file stored in the directory; and
means for saving the earliest expiration date in a second data area managed by the file system, wherein the second data area includes a directory identifier corresponding to the directory.

9. The information handling system as described in claim 8 further comprising:
means for receiving a request, wherein the request includes the directory identifier;
means for retrieving a current date from a computer system and the earliest expiration date from the second data area;
means for comparing the earliest expiration date to the current date; and
means for deleting one or more files from the directory in response to the earliest expiration date being earlier than the current date.

10. The information handling system as described in claim 9 further comprising:
means for determining a next earliest expiration date from one or more remaining file expiration dates, wherein the remaining file expiration dates correspond the files remaining in the directory following the means for deleting; and
means for saving the next earliest expiration date in the second data area.

11. The information handling system as described in claim 9 further comprising:
means for comparing one or more file expiration dates corresponding to one or more files stored in the directory to the current date; and
means for deleting at least one of the files in response to the file expiration date being earlier than the current date.

12. The information handling system as described in claim 9 further comprising:
means for displaying one or more files from the directory in response to the earliest expiration date not being earlier than the current date.

13. The information handling system as described in claim 8 further comprising:

means for identifying a plurality of directories, each of the directories including an earliest expiration date;
means for comparing each of the earliest expiration dates to a current date; and
means for deleting one or more files from one or more of the directories in response to the earliest expiration date for the respective directory being earlier than the current date.

14. A computer program product stored in a computer operable media for managing files, said computer program product comprising:
means for receiving a file expiration date that corresponds to a file stored in a directory;
means for storing the file expiration date in a first data area managed by a file system, wherein the first data area includes a file identifier corresponding to the file;
means for determining an earliest expiration date from one or more file expiration dates, wherein each of the file expiration dates correspond to a different file stored in the directory; and
means for saving the earliest expiration date in a second data area managed by the file system, wherein the second data area includes a directory identifier corresponding to the directory.

15. The computer program product as described in claim 14 further comprising:
means for receiving a request, wherein the request includes the directory identifier;
means for retrieving a current date from a computer system and the earliest expiration date from the second data area;
means for comparing the earliest expiration date to the current date; and
means for deleting one or more files from the directory in response to the earliest expiration date being earlier than the current date.

16. The computer program product as described in claim 15 further comprising:
means for determining a next earliest expiration date from one or more remaining file expiration dates, wherein the remaining file expiration dates correspond the files remaining in the directory following the means for deleting; and
means for saving the next earliest expiration date in the second data area.

17. The computer program product as described in claim 15 further comprising:
means for comparing one or more file expiration dates corresponding to one or more files stored in the directory to the current date; and
means for deleting at least one of the files in response to the file expiration date being earlier than the current date.

18. The computer program product as described in claim 15 further comprising:
means for displaying one or more files from the directory in response to the earliest expiration date not being earlier than the current date.

19. The computer program product as described in claim 14 further comprising:
means for identifying a plurality of directories, each of the directories including an earliest expiration date;

means for comparing each of the earliest expiration dates to a current date; and means for deleting one or more files from one or more of the directories in response to the earliest expiration date for the respective directory being earlier than the current date.

20. The computer program product as described in claim 14 wherein the first and second data areas are each part of an inode area managed by a UNIX operating system.

* * * * *